United States Patent
Koizumi (10) Patent No.: US 10,684,905 B2
(45) Date of Patent: Jun. 16, 2020

(54) DISK DEVICE AND NOTIFICATION METHOD OF THE DISK DEVICE

(71) Applicant: NEC Corporation, Minato-ku, Tokyo (JP)

(72) Inventor: Fumiaki Koizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 118 days.

(21) Appl. No.: 15/923,112

(22) Filed: Mar. 16, 2018

(65) Prior Publication Data

US 2018/0276066 A1 Sep. 27, 2018

(30) Foreign Application Priority Data

Mar. 22, 2017 (JP) ................................. 2017-055593

(51) Int. Cl.
*G06F 11/00* (2006.01)
*G06F 11/07* (2006.01)
*G06F 3/06* (2006.01)
*G06F 1/26* (2006.01)

(52) U.S. Cl.
CPC .......... *G06F 11/0772* (2013.01); *G06F 1/263* (2013.01); *G06F 3/0617* (2013.01); *G06F 3/0619* (2013.01); *G06F 3/0653* (2013.01); *G06F 3/0658* (2013.01); *G06F 3/0676* (2013.01); *G06F 3/0689* (2013.01); *G06F 11/073* (2013.01)

(58) Field of Classification Search
CPC ............... G06F 11/0772; G06F 11/073; G06F 11/0727; G06F 11/0766; G06F 11/0784; G06F 11/0787; G06F 1/263; G06F 3/0617; G06F 3/0653; G06F 3/0689; G06F 3/0619; G06F 3/0658; G06F 3/0676

See application file for complete search history.

(56) References Cited

U.S. PATENT DOCUMENTS

| | | | |
|---|---|---|---|
| 2006/0010458 A1* | 1/2006 | Georgis | G11B 23/0303 720/600 |
| 2006/0181400 A1* | 8/2006 | Cox | G06Q 10/087 340/505 |
| 2006/0212755 A1* | 9/2006 | Urmanov | G01H 1/003 714/25 |
| 2008/0130156 A1* | 6/2008 | Chu | G11B 20/18 360/71 |

(Continued)

FOREIGN PATENT DOCUMENTS

| | | |
|---|---|---|
| JP | H06-349261 A | 12/1994 |
| JP | H07-240063 A | 9/1995 |

(Continued)

OTHER PUBLICATIONS

Japanese Office Action for JP Application No. 2017-055593 dated May 29, 2018 with English Translation.

*Primary Examiner* — Joseph D Manoskey (57) ABSTRACT

A disk device includes; a sensor that, when a driver that records and reads data in the disk device is in a non-operation state, detects an influence on the disk device; a determination circuit that determines based on a detection result of the sensor whether the detection result satisfies a condition leading to a failure of the disk device; and a transmitter that transmits information relating to a fact that the detection result satisfies the condition, to another device.

9 Claims, 6 Drawing Sheets

(56) References Cited

U.S. PATENT DOCUMENTS

| | | | | |
|---|---|---|---|---|
| 2009/0161243 A1* | 6/2009 | Sharma | ................. | G11B 27/36 360/31 |
| 2010/0262857 A1* | 10/2010 | Enarson | ............... | G06F 11/073 714/2 |
| 2013/0305104 A1 | 11/2013 | Kato et al. | | |
| 2015/0169234 A1* | 6/2015 | Lin | ...................... | G06F 3/0656 360/55 |

FOREIGN PATENT DOCUMENTS

| | | |
|---|---|---|
| JP | 2009-110224 A | 5/2009 |
| JP | 2010-123216 A | 6/2010 |
| JP | 2011-154461 A | 8/2011 |
| JP | 2013-236337 A | 11/2013 |
| JP | 2016-005030 A | 1/2016 |

\* cited by examiner

| DETECTION TIME | HUMIDITY(%) |
|---|---|
| 2017/02/21 13:14:15 | 25.5 |
| 2017/02/21 13:19:15 | 25.8 |
| 2017/02/21 13:24:15 | 25.3 |
| 2017/02/21 14:14:15 | 21.0 |
| ... | ... |

21 DETECTION TIME
22 HUMIDITY(%)
20 DETECTION RESULT

DISK DEVICE AND NOTIFICATION METHOD OF THE DISK DEVICE

This application is based upon and claims the benefit of priority from Japanese Patent Application No. 2017-055593, filed on Mar. 22, 2017, the disclosure of which is incorporated herein in its entirety by reference.

TECHNICAL FIELD

The present disclosure relates to a disk device and a notification method.

BACKGROUND ART

Hard Disk device (HDD) and a device including the HDD (hereinafter, collectively referred to as disk device) may be affected by external impact or vibration, or external temperature or humidity for example. For example, when the disk device is stored in the warehouse, it is probable that the disk device is placed in the environment (high temperature/plentiful moisture) which is bad enough to cause the abnormality.

A technique of identifying the abnormality of the disk record playing device (disk device) is disclosed in, for example, Japanese Unexamined Patent Publication (Kokai) No. 7-240063 (PTL1). In the PTL 1, the disk record playing device records data detected by a vibration/impact sensor. When the disk record playing device is connected with a control device, the control device reads the recorded data. Accordingly, the control device can identify the abnormality of the disk record playing device.

Further, one example of a system for detecting a state of a vehicle is disclosed in Japanese Unexamined Patent Publication (Kokai) No. 2009-110224 (PTL 2).

SUMMARY

An example object of the present disclosure is to provide a technique of enabling, for example, a manager who manages a disk device or a user who uses a disk device to save the disk device from a bad environment in a shorter period of time or to improve the environment of the disk device.

An example aspect of the present invention is a disk device. The device includes; a sensor that, when a driver that records and reads data in the disk device is in a non-operation state, detects an influence on the disk device; a determination circuit that determines based on a detection result of the sensor whether the detection result satisfies a condition leading to a failure of the disk device; and a transmitter that transmits information relating to a fact that the detection result satisfies the condition, to another device.

An example aspect of the present invention is a notification method of a disk device. The method includes detecting, when a driver that records and reads data in the disk device is in a non-operation state, an influence on the disk device; determining whether the influence on the disk device satisfies a condition leading to a failure of the disk device; and transmitting information relating to a fact that the condition is satisfied to an another device.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

Figure 1:
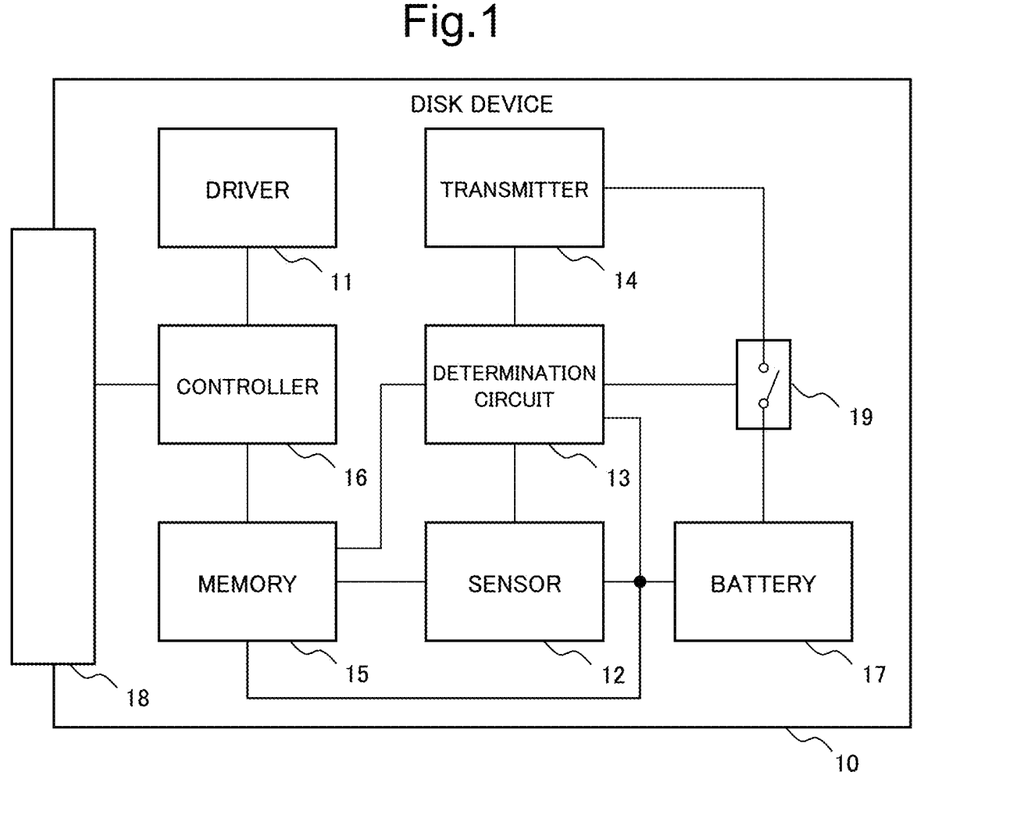
FIG. 1 is a block diagram illustrating one example of a configuration of a disk device according to a first example embodiment.

The first example embodiment of the present disclosure is described in details with reference to the drawings. FIG. 1 is the block diagram illustrating one example of a configuration of a disk device 10 according to the first example embodiment. The disk device 10, as illustrated in FIG. 1, as one configuration example, includes a driver 11, a sensor 12, a determination circuit 13, a transmitter 14, a memory 15, a controller 16, a battery 17 and an input-output interface 18. The disk device 10 may further include a switch 19. Note that in addition to above, the disk device 10 includes a recording mechanism for recording data (not illustrated), and an interface connected with an external power source (not illustrated). When the disk device 10 is a Hard Disk Drive (HDD), the mechanism for recording the data includes, for example, a platter or another device for recording the data. The external power source is, for example, a commercial power supply of 100V.

In the first example embodiment, it is assumed that the disk device 10 is the HDD. In other words, the disk device 10 is, for example a single device such as a built-in HDD for an Advanced Technology (AT) compatible machine or an external HDD. Further, the disk device 10 may be the external HDD including one built-in HDD or a plurality of built-in HDDs.

Each component of the disk device 10 illustrated in FIG. 1 is implemented in a form in which each component is provided to, for example, Printed Circuit Board Assembly (PCBA). Further, in FIG. 1, lines connecting each component of the disk device 10 indicates flows of the electric power or the data.

The driver 11 records and reads the data. The driver 11 reads the data stored in the recording mechanism of the disk device 10 or records the data in the recording mechanism. Further, the driver 11 may drive each element (not illustrated) of the disk device 10. For example, the driver 11 includes the platter (magnetic disk), a magnetic read/write head for writing/reading data to/from the platter, and the motor for rotating the platter. Through operations of the driver 11, in the disk device 10, writing and reading of the data are conducted. The operations of the driver 11 are similar to operations of the head, and the motor of the general HDD. The driver 11 operates with the electric power supplied from the external power source. Accordingly, when the disk device 10 is not connected with the external power source, the driver 11 does not operate.

The sensor 12, when the driver 11 is not operated, detects an influence on the disk device 10. For example, the sensor 12 detects the impact and the vibration externally applied to the disk device 10, and the temperature and the humidity inside the disk device 10 varying due to the influence of the temperature and the humidity around the disk device 10. In other words, the sensor 12 detects a phenomenon that would cause a failure or a damage to the disk device 10.

When the sensor 12 detects the impact and the vibration applied to the disk device 10, for example, the sensor 12 is implemented by an impact sensor, an acceleration sensor, or a vibration sensor. When the sensor 12 detects the temperature and/or the humidity of the disk device 10, for example, the sensor 12 is implemented by a temperature and humidity sensor, a temperature sensor, or a humidity sensor. In other words, as the sensor 12, a sensor similar to a sensor used in a general HDD is applied. Further, a plurality of types of sensors 12 may be used.

It is preferable that the sensor 12 always detects the influence on the disk device 10. The sensor 12 always detects the influence on the disk device 10, and thus, when the failure is found in the disk device 10, it is easy to identify the cause. For example, when the sensor 12 detects the impact and the vibration, it is preferable that the sensor 12 is in a state where the impact and the vibration are detectable. Further, when the sensor 12 detects the peripheral temperature and humidity, it is preferable that the sensor 12 detects, at a predetermined interval, the peripheral temperature and humidity of the disk device 10. The predetermined interval may be an interval set according to the environment where the disk device 10 is placed, or according to the type of the disk device 10.

Information detected by the sensor 12 (referred to as "detection result") is supplied to the determination circuit 13. Note that the sensor 12 may store the detection result to the memory 15.

The determination circuit 13 determines whether the detection result of the sensor 12 satisfies a condition leading to a failure of the disk device 10. The determination circuit 13, for example, converts a data format of the detection result, and analyzes whether the impact or the temperature that might cause the damage to the disk device 10 is applied. In general, relating to peripheral environments such as a temperature, a humidity, and an acceleration when the disk device 10 does not operate (non-operation state), an acceptable condition is predetermined. A condition leading to the failure corresponds to the temperature, the humidity and/or the acceleration exceeding the acceptable condition. The determination circuit 13 determines, for example, whether the detection result detected by the sensor 12 deviates a temperature, a humidity, an impact amount and/or a vibration amount that are acceptable in the non-operation state.

For example, when the sensor 12 detects the temperature, the determination circuit 13 determines whether the temperature exceeds a threshold value determined in advance as an upper limit of a temperature which is acceptable in a non-operation state. Then, the determination circuit 13 supplies the determination result to the transmitter 14.

Note that the determination circuit 13 may make the above described determination using the detection result stored in the memory 15. Further, the determination circuit 13, among the detection results detected by the sensor 12, may store the detection result satisfying the condition leading to the failure to the memory 15. At this time, the determination circuit 13 may, together with information for identifying the disk device 10, such as a model number and a serial number of the disk device 10 and information representing types of sensors, store the detection result satisfying a predetermined condition to the memory 15.

Further, the determination circuit 13 may calculate a value representing how much the detection result deviates a condition that is acceptable in a non-operation state, or a value representing a risk of the occurrence of the abnormality. Then, the determination circuit 13 may assume the calculated value as a value representing the degree of the abnormality, associate the value with the detection result satisfying a predetermined condition, and store the associated value and detection result in the memory 15.

A value representing the degree of the abnormality is, for example, when the sensor 12 is a sensor for detecting the vibration and the impact, a value representing a rank when the vibration amount and the impact amount are classified into the plurality of ranks using a plurality of threshold values determined in advance. The determination circuit 13 may conduct the ranking using a data value, i.e., the detection result as it is or may conduct the ranking by normalizing the value to a value within the range determined in advance. For example, it is assumed that, based on a range of a vibration amount detectable by the sensor 12, the determination circuit 13 normalizes the vibration amount to values from 0 to 100. Then, it is assumed that the values from 0 to 25 are D rank, the values from 26 to 50 are C rank, the values from 51 to 75 are B rank, the values from 76 to 100 are A rank, A is the value having the highest degree of abnormality, and D is a value having the lowest degree of abnormality. The determination circuit 13, by determining to what rank the normalized value belongs, may calculate values of the ranks (A to D). Then, the determination circuit 13 may associate the calculated values of the ranks to the detection result satisfying the predetermined condition and store the associated value and detection result to the memory 15. Note that it is enough if a value representing the degree of the abnormality is a value representing to what extent the detection result deviates a condition that is accepted in a non-operation state or a value representing a risk of the occurrence of the abnormality, and the value representing the degree of the abnormality may be represented in any format. Further, how to classify values when the values are classified into a plurality of ranks is not particularly limited, and the values may be appropriately set based on type of the disk device 10, and/or types of sensors.

The determination circuit 13 is implemented by, for example, the dedicated or the general-purpose System On a Chip (SoC). However, the determination circuit 13 may be implemented in other forms other than the above.

The transmitter 14 transmits information relating to a fact that the detection result of the sensor 12 satisfies the condition leading to the failure of the disk device 10 to an external device. The transmitter 14 receives, from the determination circuit 13, a determination result, and when the determination result satisfies the condition, the transmitter 14 transmits information relating to a fact that the determination result satisfies the condition, to the external device.

As described above, the determination circuit 13 determines whether the detection result detected by the sensor 12 deviates the condition that is accepted in the non-operation state. Accordingly, the transmitter 14 transmits information relating to a fact that the disk device 10 is suffered influences deviating from the acceptable vibration amount, impact amount, temperature or humidity to the external device of the disk device 10.

The transmitter 14 may transmit information relating to a fact of satisfying the condition leading to the failure of the disk device 10 to the external device together with, for example, information for identifying the disk device 10, information representing types of sensor 12, the detection result, or a value representing the degree of abnormality.

The transmitter 14 is implemented with, for example, an Radio Frequency Identifier (RFID) chip. The transmitter 14 is not limited to this, and may be a device that includes an antenna and can transmit information to the another device using a communication system such as Bluetooth® and Wi-Fi®. By the transmitter 14 being the RFID chip, the disk device 10 can, with a simple configuration, transmit information to the another device. Further, the RFID chip may be a passive type or an active type, and may be a semi-active type. When the RFID chip is the active type or the semi-active type, the transmitter 14, based on a control of the determination circuit 13, receives, for example, the electric power from the battery 17 described later. Further, by the RFID chip being the passive type, the transmitter 14 does not consume the electric power of the battery 17. Accordingly, the disk device 10 can reduce a load applied to the battery 17.

Further, the transmitter 14, based on the value representing the degree of the abnormality and information representing types of the sensor 12, among detection results, may transmit a detection result further satisfying the predetermined condition to the another device. For example, the transmitter 14 may transmit a detection result whose abnormality degree is determined to be higher to the another device, as the information relating to the fact that the detection result satisfies the predetermined condition. Accordingly, a manager who manages the disk device 10 using the another device, when, for example, an environment in which the disk device 10 is placed is more bad environment, can cause the disk device 10 to be retracted from the bad environment.

The memory 15 stores the detections results of the sensor 12. The memory 15 may store all data detected by the sensor 12 (all detection results). In this case, when a total amount of data detected by the sensor 12 exceeds a capacity of the memory 15, data may be overwritten from, for example, the oldest data in order.

Further, the memory 15, among detection results with respect to data detected by the sensor 12, may store a detection result that is determined by the determination circuit 13 as satisfying a condition leading to a failure of a disk device.

As an example, the memory 15 may store information on the data when the change in the data detected by the sensor 12 increases beyond a predetermined threshold. For example, the memory 15 may store a series of data indicating the change in the temperature when the data detected by the sensor 12 indicates that the temperature has changed by 5 degrees or more within a certain period of time.

The data may be stored in the memory 15 when the impact and/or the temperature which are causes of the damages are applied such as when the data detected by the sensor 12 represents the deviation from the condition of the environment which is accepted in the non-operation state of the disk device 10.

For example, under a condition where the upper limit of the temperature acceptable in the non-operation state of the disk device 10 is 70 degrees C., when the sensor 12 detects the temperature exceeding 70 degrees C., the memory 15 stores information on the temperature.

Note that this case can be regarded as a case where a phenomenon leading to a failure of the disk device 10 occurs. Accordingly, the memory 15 may distinguish the data as an abnormal log and store the data.

Further, in the memory 15, the above described storage method of data may be used in combination.

For example, the memory 15 may be divided between an area for storing the above described abnormal log and an area for storing other data detected by the sensor 12. In this case, for example, the abnormal log is stored so as not to be overwritten to the memory 15. Further, other data detected by the sensor 12 may be stored in the memory 15 when a condition leading to the failure of the disk device is satisfied. These data may be overwritten when needed. Further, as described above, the value that represents the degree of the abnormality and is calculated by the determination circuit 13 may be associated with the detection result satisfying the predetermined condition and the memory 15 may store the associated value and detection result.

Figure 2:
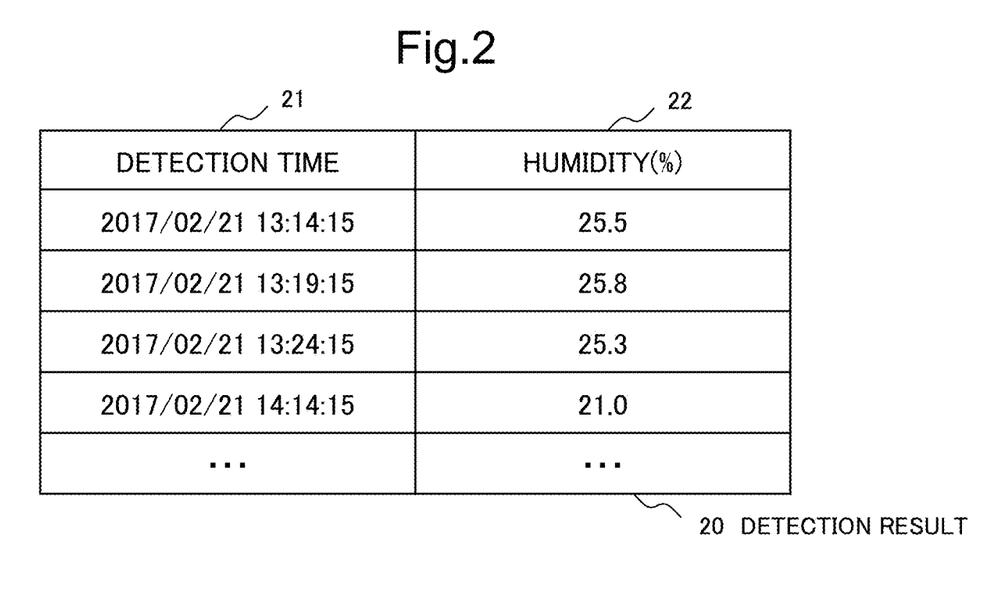
FIG. 2 is a drawing illustrating one example of a detection result stored in a memory of the disk device according to the first example embodiment.

Note that a format of data stored in the memory 15 is not particularly limited. FIG. 2 is a drawing illustrating one example of a detection result stored in the memory 15 of the disk device 10 according to the first example embodiment. Here, descriptions are given by assuming that the sensor 12 is a hygrometer. As illustrated in FIG. 2, a detection result 20 includes a detection time 21 of the sensor 12 and a humidity 22 which is a value detected by the sensor 12 at the detection time 21. The detection result 20 is stored by the sensor 12. Note that each record of the detection result 20 may be associated with the determination results by the determination circuit 13 to be stored.

Further, data stored in the memory 15 is appropriately determined depending on types of the sensor 12, analysis contents by the determination circuit 13, or a storage capacity of the memory 15. As one example, the memory 15 is implemented by a nonvolatile memory such as a flash memory. Data stored in the memory 15 are, based on the control of the controller 16 described later, accessed from the another device.

In this manner, the memory 15 records the detection result 20. Accordingly, for example, a person who manages a quality of the disk device 10 can analyze an influence on the disk device 10 in details.

The controller 16 controls reading of data from the memory 15 such that the another device can access the memory 15. Specifically, when the disk device 10 is, via the input-output interface 18, communicably connected with the another device, the controller 16 controls the another device such that the another device can read the detection result 20 stored in the memory 15. Accordingly, for example, a person who manages a quality of the disk device 10 can, using the another device, analyze the influence on the disk device 10 in details.

The controller 16 may control the entire disk device 10. When, for example, from an external power source, the electric power is supplied to the disk device 10, the controller 16 causes the driver 11 to be operated. Alternatively, when from the external power source, the electric power is not supplied or the power supply is not turned on, the controller 16 may control the sensor such that based on the electric power supplied from the battery 17, the sensor 12 operates. By the controller 16 conducting the above described control, even when the electric power is not supplied from the external power source such as when the disk device 10 is transported, it is possible to detect a phenomenon related to the cause of failure or damage of the disk device 10, by the sensor 12.

The controller 16 is implemented by a circuit of, for example, a dedicated or general-purpose processor. In other words, the controller 16 is implemented as a control circuit or a control processor which conducts the above described control. For example, the controller 16 is implemented as the SoC or the control circuit obtained by combining several circuits. Further, the controller 16 may be implemented by a combination of the processor and a program with respect to operations as the controller 16. To the controller 16, a mechanism for controlling the supply of the electric power may be provided together when needed such as a circuit for performing switching between the external power source and the battery 17 depending on a connection state of the external power source and an operation state of the driver 11.

Note that when the disk device 10 includes a plurality of HDDs, the controller 16 can assume the plurality of HDDs as control targets.

When the supply of the electric power from the external power source is stopped such as when the external power source is not connected and the power supply of the disk device 10 is not turned on, the battery 17 supplies, to at least the sensor 12 and the determination circuit 13, the electric power. Accordingly, even when the electric power is not supplied to the disk device 10 from the external power source such as when the battery 17 is not connected with the external power source, the determination circuit 13 can cause the sensor 12 to perform the state detection and determine the data detected by the sensor 12. Further, the battery 17 may supply the electric power to the memory 15 in addition to the determination circuit 13 such that data stored in the memory 15 is determined and a detection result detected by the sensor 12 and a determination result output by the determination circuit 13 are stored. Note that at this time, based on the control of an unillustrated switch by the sensor 12, the determination circuit 13 or the controller 16, at a timing in which data is stored in the memory 15, the electric power of the battery 17 supplied to the memory 15 may be supplied. For example, the sensor 12 may be controlled so that the electric power is supplied to the memory 15 at the timing when the sensor 12 stores the detection result, for example, at the timing when the detection result is stored in the memory 15 when the influence is detected, or at the timing when the amount of the detection result (number or data size) reaches the predetermined amount.

The electric power of the battery 17 may be supplied to the transmitter 14 when the transmitter 14 transmits, to the another device, information relating to a fact of satisfying the condition. For example, at a timing in which the determination circuit 13 supplies the determination result to the transmitter 14, the determination circuit 13 may control the switch 19 for connecting the transmitter 14 and the battery 17 so that the electric power of the battery 17 is supplied to the transmitter 14. Accordingly, the disk device 10 can reduce the power consumption of the battery 17.

It is enough if the battery 17 can supply the electric power to the extent that the sensor 12 can operate while the supply of the electric power from the external power source is stopped, and types are not particularly limited. In other words, in the first example embodiment, the electric power that can be supplied from the battery 17 may be smaller than the electric power supplied from the external power source or the electric power supplied from a battery that can drive the driver 11. Further, it is enough if a discharge capacity of the battery 17 is a capacity allowing a continuous operation of the sensor 12 while the supply of the electric power from the external power source is stopped. If the electric power that is large to the extent that the sensor 12 is operable can be supplied, as the battery 17, any primary battery or any secondary battery is used. Further, it is preferable that a size of the battery 17 is large to the extent that the battery can be housed in a housing (not illustrated) of the disk device 10.

Note that when the disk device 10 includes a plurality of HDDs, to each of the plurality of HDDs, the batteries 17 may be provided separately, or to each of the plurality of HDDs, a single battery 17 for supplying the electric power may be provided. Further, when the battery 17 continuously receives the electric power from the external power source, the battery may have a removable configuration.

For example, the input-output interface 18 is implemented with a general connector. The input-output interface 18 connects the another device with the disk device 10. The another device connected with the input-output interface 18 may be a device for analyzing the detection result 20 stored in the memory 15 of the disk device 10 or may be a control device having a processor that is incorporated in a device together with the disk device 10.

Figure 3:
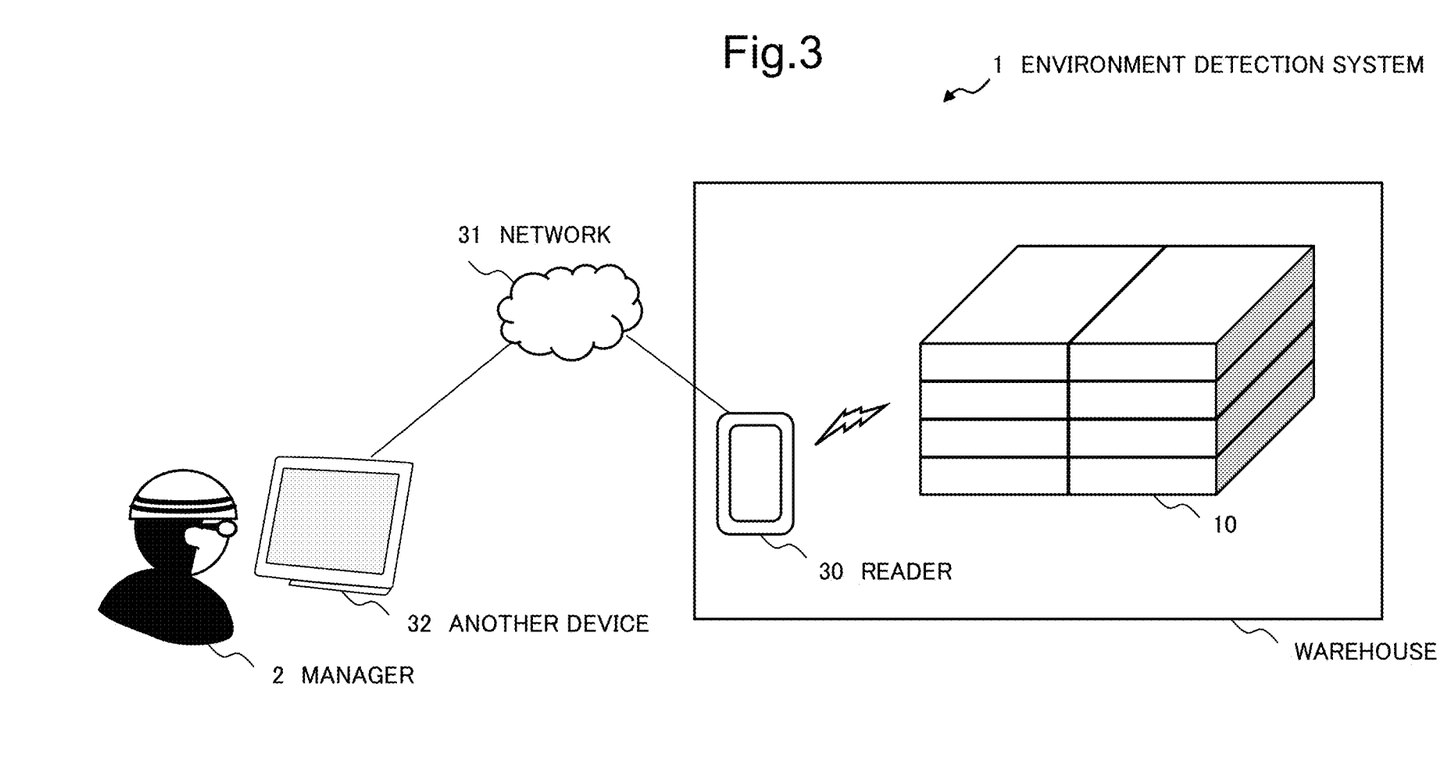
FIG. 3 is a drawing illustrating one example of a configuration of an environment detection system including the disk device according to the first example embodiment.

FIG. 3 is a drawing illustrating one example of a configuration of an environment detection system 1 including the disk device 10 according to the first example embodiment. As illustrated in FIG. 3, the environment detection system 1 includes one or more disk devices 10 and another device 32. It is assumed that a plurality of disk devices 10 are stored in the warehouse for example. In this case, each disk device 10 is not connected with an external power source. Accordingly, the driver 11 of each disk device 10 is in a non-operating state. As described above, since the transmitter 14 of the disk device 10 is assumed to be the RFID chip, the environment detection system 1 includes a reader 30 that receives information from the RFID chip. The reader 30 is connected with the another device 32 via a network 31. As a result, the another device 32 can receive information (for example, the determination result) indicating that the detection result of the sensor 12 transmitted from the transmitter 14 satisfies the condition leading to the failure of the disk device 10. Accordingly, even if the disk device 10 is stored in the warehouse to which the electric power is not supplied from the external power source, a manager 2, for example, via a display unit of the another device 32, can promptly understand that an environment in which the disk device 10 is placed is not an appropriate environment. Thus, the manager 2 can cause the disk device 10 placed in such environment to be retracted from such environment in a shorter period of time or can improve such environment of the disk device 10.

Further, prior to the actual incorporation of the disk device 10 to a device, the manager 2 can understand a possibility of an occurrence of an abnormality to the disk device 10.

Note that a method of making the manager 2 understand a fact that the detection result of the sensor 12 that detects the influence on the disk device satisfies the condition leading to the failure of the disk device 10 (bad environment) is not limited to displaying, and a method of notifying the fact with a sound and a vibration may be adopted. When information transmitted from the transmitter 14 includes types of the sensor 12 or the value representing the degree of the abnormality, the another device 32, depending on the types of the sensor 12 or the value representing the degree of the abnormality, based on different methods, may make the manager 2 understand the detection result.

It is preferable that information received by the another device 32 includes information for identifying the disk device 10. Accordingly, the manager 2 can easily identify the disk device 10 that is suffered the influence leading to the failure. Thus, the manager 2 can easily retract such disk device 10 or improve an environment in which the disk device 10 is placed.

Figure 4:
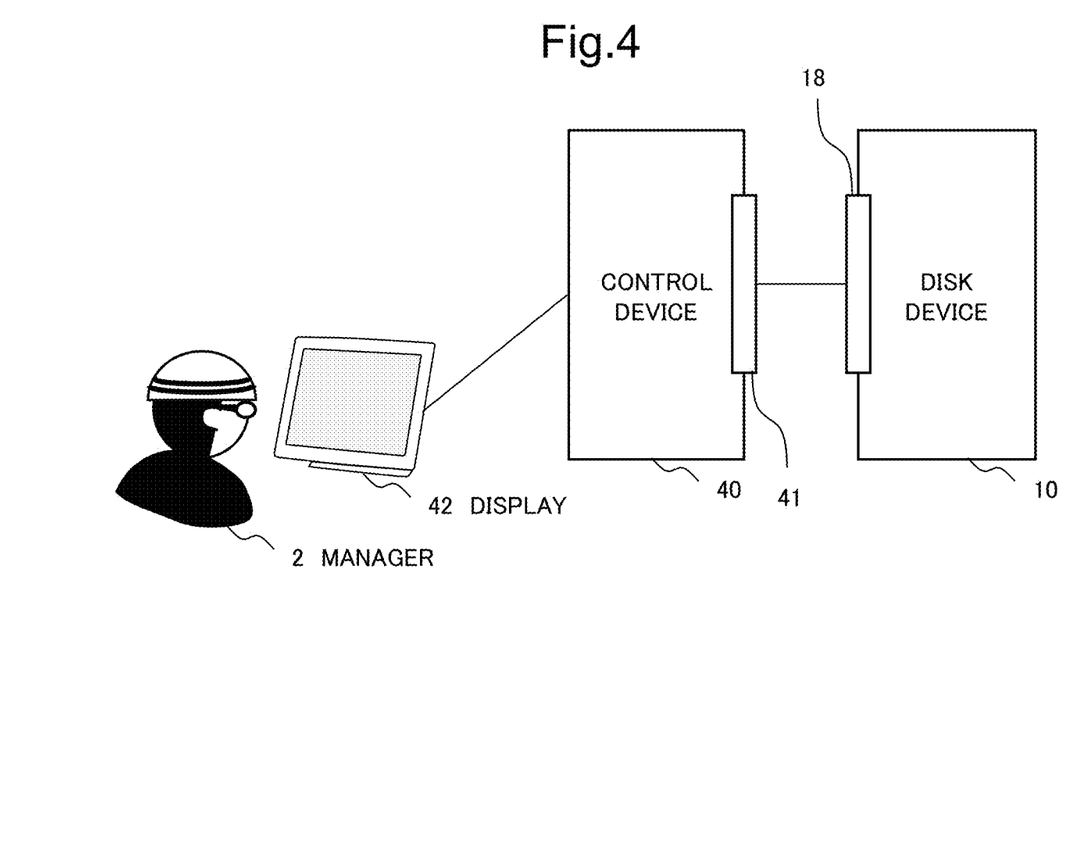
FIG. 4 is a drawing illustrating one example when the disk device according to the first example embodiment is communicably connected with an external device.

FIG. 4 is a drawing illustrating one example when the disk device 10 according to the first example embodiment is communicably connected with the another device. In FIG. 4, as one example of the another device, descriptions are given by taking an example of a control device 40. It is assumed that the control device 40 is a device including a processor which is incorporated into a device such as a server together with the disk device 10. The control device 40 may be the above described the another device 32. The control device 40 includes an input-output interface 41 for the connection with the disk device 10. The control device 40 and the disk device 10 are communicably connected via the input-output interface 41 and the input-output interface 18. Accordingly, the controller 16 conducts the control such that the control device 40 can read the detection result 20 stored in the memory 15. For example, the control device 40 can display the read detection result 20 to a display 42 connected with the control device 40. Thus, by using the display 42, the manager 2 who identifies the detection result 20 can analyze an environment in which the disk device 10 is placed in details.

Note that the controller 16 of the disk device 10 may have functions (self-diagnosis function) of diagnosing the disk device 10 and determining whether the disk device 10 has an abnormality when a power supply is supplied to the disk device 10. For example, when the external power source is supplied to the disk device 10, by the disk device 10 being connected with the control device 40, the controller 16 starts the self-diagnosis function and determines whether the disk device 10 has the abnormality. The determination as to whether the device has the abnormality by the controller 16 may be conducted by referring to the detection result 20 stored in the memory 15. For example, the controller 16 may determine whether the disk device 10 has the abnormality based on whether there is a detection result in which the determination circuit 13 determines that the predetermined condition is satisfied. When the controller 16 determines that the abnormality is present, the controller 16 may conduct controls such that the control device 40 can refer to the detection result 20 stored in the memory 15 of the disk device 10 and data recorded in a recording mechanism of the disk device 10 may not be accessed. In other words, when the controller 16 determines that the abnormality is present, the controller 16 may conduct the control such that the recording mechanism of the disk device 10 is not started. The transmitter 14 may transmit the determination result representing the presence of the abnormality to the control device 40. Accordingly, the disk device 10 can make the manager 2 who uses the display 42 connected with the control device 40 understand the presence of the abnormality to the disk device 10 connected with the control device 40 prior to starting the disk device 10. Further, the transmitter 14 may transmit the determination result indicating that there is no abnormality to the control device 40.

Figure 5:
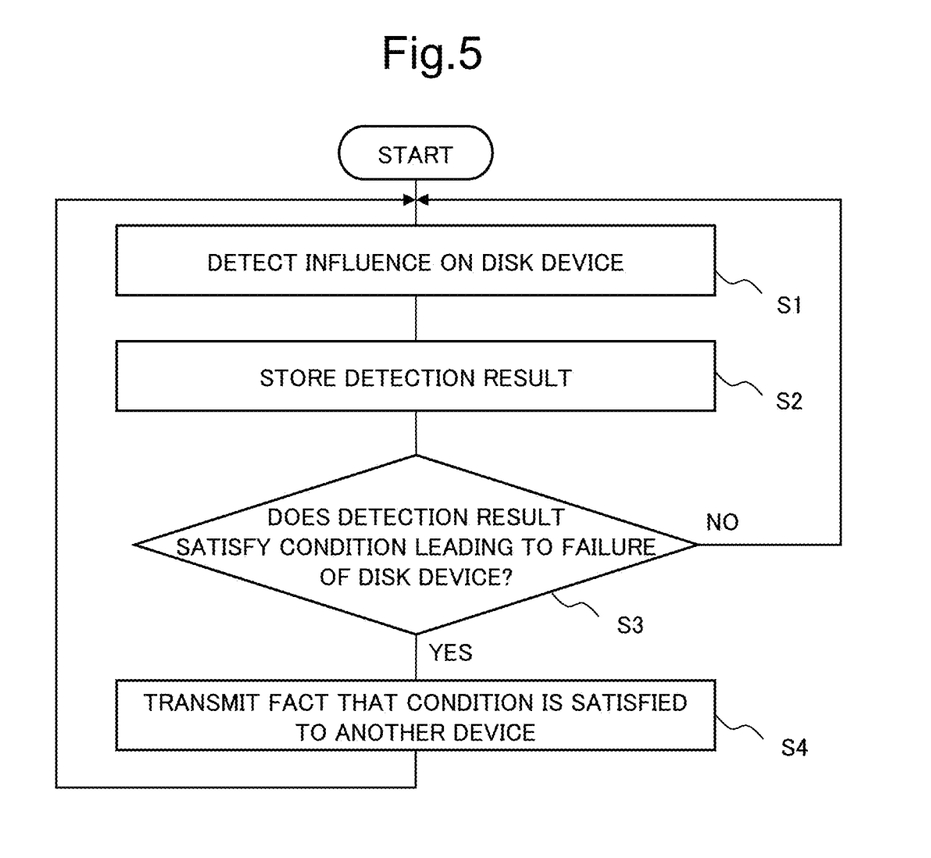
FIG. 5 is a flowchart illustrating one example of flows of processes of the disk device according to the first example embodiment.

Next, with reference to FIG. 5, a process flow of the disk device 10 is described. FIG. 5 is a flowchart illustrating one example of the process flow of the disk device 10 according to the first example embodiment.

First, when the driver 11 is in the non-operation state, the sensor 12 detects the influence on the disk device 10 (step S1). The sensor 12 causes the memory 15 to store the detection result (step S2). Then, the determination circuit 13 determines whether the detection result of the sensor 12 satisfies the condition leading to the failure of the disk device 10 (step S3). When the detection result does not satisfy the condition leading to the failure of the disk device 10 (NO at step S3), the process returns to step S1 and the sensor 12 acquires a next detection result.

When the detection result of the sensor 12 satisfies the condition leading to the failure of the disk device 10 (YES at step S3), the transmitter 14 transmits information relating to a fact that the detection result of the sensor 12 satisfies the above described condition to the another device (step S4). At this time, the determination circuit 13 may store the detection result satisfying the above described condition in the memory 15. Then, the process returns to step S1 and the sensor 12 acquires a next detection result.

As described above, in the disk device 10 according to the first example embodiment, the sensor 12 detects the influence on the disk device 10 when the driver 11 is not operated (in non-operation state). Then, the transmitter 14 transmits information relating to a fact that the detection result of the sensor 12 satisfies the condition leading to the failure of the disk device 10 to the another device. Accordingly, even if the disk device 10 is stored in the warehouse to which the external power source is not supplied, for example, the manager 2 can promptly grasp, via a display unit of the another device, whether the disk device 10 is suffered the influence leading to the failure. Accordingly, the manager 2 can retract the disk device 10 from such an environment that is affected in a shorter period of time or can improve the environment of the disk device 10 such that such influence is not applied to the disk device 10.

Second Example Embodiment

Next, a second example embodiment of the present disclosure is described with reference to FIG. 6. In the second example embodiment, a minimum configuration for solving problems of the present disclosure is described.

Figure 6:
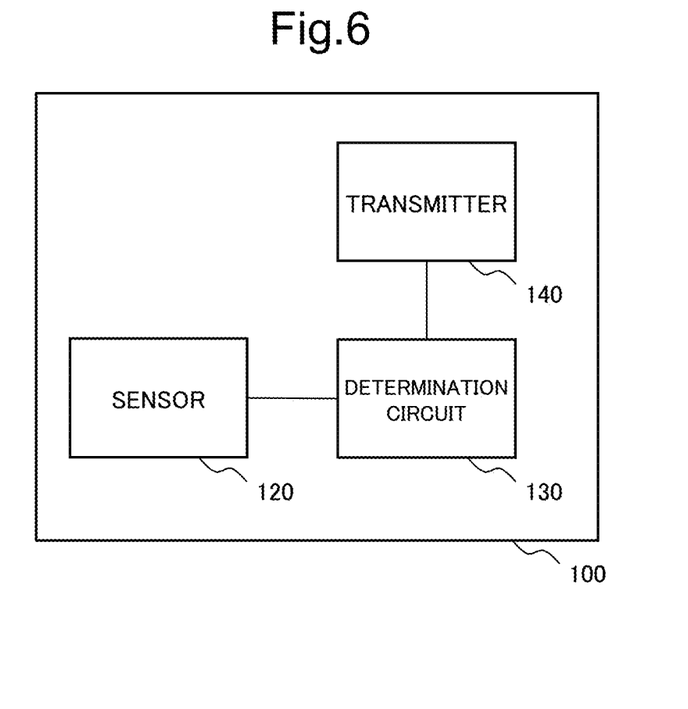
FIG. 6 is a functional block diagram illustrating one example of a functional configuration of a disk device according to a second example embodiment.

FIG. 6 is a function block diagram illustrating one example of a functional configuration of the disk device 100 according to the second example embodiment. As illustrated in FIG. 6, the disk device 100 according to the second example embodiment includes the sensor 120, the determination circuit 130, and the transmitter 140.

The disk device 100 may include a driver (not illustrated in FIG. 6). In this case, the driver has, for example, the function of the driver 11 of the first example embodiment. The driver reads the data recorded in the recording mechanism of the disk device 100 and records the data to the recording mechanism.

The sensor 120, for example, has the function of the sensor 12 (refer to FIG. 1) of the first example embodiment. The sensor 120 detects the influence on the disk device 100 when the driver of the disk device 100 is in the non-operation state.

The determination circuit 130 has, for example, the function of the determination circuit 13 (refer to FIG. 1) of the first example embodiment. The determination circuit 130 may have functions of the controller 16 (refer to FIG. 1) in addition to functions of the determination circuit 13. The determination circuit 130 determines whether the detection result of the sensor 120 satisfies a condition leading to the failure of the disk device 100. Note that the determination circuit 130 may include a processor.

The transmitter 140 has the functions of the transmitter 14 of the first example embodiment. When the determination circuit 130 determines that the detection result of the sensor 120 satisfies a condition leading to the failure of the disk device 100, the transmitter 140 transmits information relating to the fact that the determination result satisfies the condition, to the another device.

From this, for example, a manager who manages a quality of the disk device 100, using the another device, can identify information transmitted to the another device. Thus, the manager can understand that an influence on the disk device 100 is an influence leading to a failure of the disk device 100. Accordingly, the manager can retract the disk device 100 from such an environment that is affected in a shorter period of time or can improve the environment of the disk device 100 such that such influence is not applied to the disk device 100.

According to the technique disclosed in PTL 1, by the disk record playing device being connected with the control device, the control device reads abnormal data recorded in the disk record playing device. Accordingly, unless the disk record playing device is connected with the control device, it is not clear whether the disk record playing device is in an abnormal state. Thus, there is a possibility that the disk record playing device is continuously placed in a bad environment leading to a failure.

According to the present disclosure, it is possible to retract a disk device from the bad environment leading to failure in a shorter time or improve the environment of the disk device.

The previous description of the example embodiments is provided to enable a person skilled in the art to make and use the present invention. Moreover, various modifications to these example embodiments will be readily apparent to those skilled in the art, and the generic principles and specific examples defined herein may be applied to other example embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A disk device comprising:
a sensor that, when a driver that records and reads data in the disk device is in a non-operation state, detects an influence on the disk device;
a determination circuit that determines based on a detection result of the sensor whether the detection result satisfies a condition leading to a failure of the disk device;
a transmitter that transmits information relating to a fact that the detection result satisfies the condition, to another device;
a memory storing a detection result of the sensor; and
a battery that, when electric power from an external power source is not supplied to the disk device, supplies electric power to at least the sensor and the determination circuit, wherein
the sensor controls the battery to supply the electric power to the memory at a timing when the sensor stores the detection result in the memory.

2. The disk device according to claim 1, further comprising:
a controller controlling reading of data from the memory such that the another device can access the memory.

3. The disk device according to claim 1, wherein
the battery supplies electric power to the transmitter when the transmitter transmits information relating to a fact that the condition is satisfied to the another device.

4. The disk device according to claim 1, wherein
the transmitter is a Radio Frequency IDentifier (RFID) chip.

5. The disk device according to claim 1, wherein
the sensor stores the detection result in the memory at a timing when an amount of the detection result reaches a predetermined amount.

6. The disk device according to claim 1, wherein
the memory stores the detection result when a change in the data detected by the sensor increases beyond a predetermined threshold.

7. The disk device according to claim 6, wherein
the change in the data detected by the sensor is a change within a certain period of time.

8. A notification method of a disk device, the method comprising:
detecting by a sensor, when a driver that records and reads data in the disk device is in a non-operation state, an influence on the disk device;
determining by a determination circuit whether the influence on the disk device satisfies a condition leading to a failure of the disk device;
transmitting information relating to a fact that the condition is satisfied to another device;
storing a detection result of the sensor in a memory;
supplying electric power by a battery to at least the sensor and the determination circuit when electric power from an external power source is not supplied to the disk device; and
controlling the battery to supply the electric power to the memory at a timing when the detection result is stored in the memory.

9. The notification method according to claim 8, wherein
reading of data from the memory is controlled such that the another device can access the memory.

* * * * *